US009311132B1

(12) United States Patent
Bernal et al.

(10) Patent No.: US 9,311,132 B1
(45) Date of Patent: Apr. 12, 2016

(54) ALLOCATING ALL OR A PORTION OF THE MEMORY IN A CACHE MODULE IN EACH HYPERVISOR IN A POOL OF HYPERVISORS TO FORM A SHARED CACHE MODULE TO BE UTILIZED BY THE VIRTUAL MACHINES RUN BY THE POOL OF HYPERVISORS

(71) Applicant: International Business Machines Corporation, Armonk, NY (US)

(72) Inventors: Edward R. Bernal, Raleigh, NC (US); Ivan M. Heninger, Selma, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/498,564

(22) Filed: Sep. 26, 2014

(51) Int. Cl.
*G06F 9/455* (2006.01)
*H04L 29/08* (2006.01)

(52) U.S. Cl.
CPC ........ *G06F 9/45558* (2013.01); *H04L 67/2842* (2013.01); *G06F 2009/4557* (2013.01); *G06F 2009/45583* (2013.01)

(58) Field of Classification Search
CPC .................................................. G06F 9/45558
USPC .................................................. 718/101–108
See application file for complete search history.

(56) References Cited

U.S. PATENT DOCUMENTS

| | | | | |
|---|---|---|---|---|
| 8,433,802 B2* | 4/2013 | Head | ..................... | G06F 9/5077 709/223 |
| 2010/0161759 A1* | 6/2010 | Brand | ................. | H04L 67/1097 709/218 |
| 2010/0186011 A1* | 7/2010 | Magenheimer | ....... | G06F 12/084 718/1 |
| 2012/0221765 A1 | 8/2012 | Yoo et al. | | |
| 2012/0272244 A1* | 10/2012 | Bozek | ..................... | G06F 9/461 718/1 |
| 2013/0332610 A1 | 12/2013 | Beveridge | | |
| 2014/0157363 A1* | 6/2014 | Banerjee | ............. | G06F 9/45558 726/2 |

OTHER PUBLICATIONS

Jin, X., Chen, H., Wang, X., Wang, Z., Wen, X., Luo, Y., & Li, X. (Aug. 2009). A simple cache partitioning approach in a virtualized environment. In Parallel and Distributed Processing with Applications, 2009 IEEE International Symposium on (pp. 519-524). IEEE.*
Lee, Sangmin, et al. "Validating heuristics for virtual machines consolidation." Microsoft Research, MSR-TR-2011-9 (2011), pp. 1-14.*

(Continued)

*Primary Examiner* — Satish Rampuria
(74) *Attorney, Agent, or Firm* — Robert A. Voigt, Jr.; Winstead, P.C.

(57) ABSTRACT

A method, system and computer program product for efficiently utilizing a virtual file system cache across cloud computing nodes. A determination is made as to which hypervisors will be able to share all or a portion of the memory in its cache module (look-aside cache) to become a hypervisor in a "pool of hypervisors" based on the workload of the virtual machines run by the hypervisor. All or a portion of the memory in the cache module in each hypervisor in the pool of hypervisors that is available to be utilized by other virtual machines is allocated to form a "shared cache module" to be utilized by virtual machines run by the pool of hypervisors. In this manner, the look-aside cache available to the hypervisor will be utilized more effectively since any available memory can be utilized by other virtual machines running on different hypervisors on different cloud computing nodes.

9 Claims, 5 Drawing Sheets

(56) References Cited

OTHER PUBLICATIONS

Ahn, Jeongseob, et al. "Dynamic virtual machine scheduling in clouds for architectural shared resources." Proceedings of the USENIX Workshop on Hot Topics in Cloud Computing (HotCloud). 2012, pp. 1-5.*

Mell et al., "The NIST Definition of Cloud Computing," Special Publication 800-145, Sep. 2011, pp. 1-7.

* cited by examiner

1

ALLOCATING ALL OR A PORTION OF THE MEMORY IN A CACHE MODULE IN EACH HYPERVISOR IN A POOL OF HYPERVISORS TO FORM A SHARED CACHE MODULE TO BE UTILIZED BY THE VIRTUAL MACHINES RUN BY THE POOL OF HYPERVISORS

TECHNICAL FIELD

The present invention relates generally to cloud computing, and more particularly to allocating all or a portion of the memory in a cache module in each hypervisor in a pool of hypervisors to form a shared cache module to be utilized by the virtual machines run by the pool of hypervisors thereby allowing the look-aside cache of the hypervisors to be more efficiently utilized.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor in which one or more virtual machines in the user portions are run by the hypervisor.

Currently, the cloud computing nodes may utilize a virtual file system cache, commonly referred to as a "look-aside cache," to be used for accelerating shared storage access. The "look-aside cache" is utilized by a single hypervisor and the virtual machines run by the hypervisor. However, in certain situations, the look-aside cache is not being fully utilized due to the minimal input/output (I/O) operations of those virtual machines. Hence, in certain situations, the look-aside cache is being inefficiently utilized.

BRIEF SUMMARY

In one embodiment of the present invention, a method for efficiently utilizing a virtual file system cache across cloud computing nodes comprises identifying which hypervisors in a cluster of cloud computing nodes have a cache module available to it. The method further comprises determining, by a processor, which of the hypervisors in the cluster of cloud computing nodes will share all or a portion of memory in the cache module to become a hypervisor in a pool of hypervisors based on a workload of virtual machines running by the hypervisor in the cluster of cloud computing nodes. Furthermore, the method comprises allocating all or a portion of the memory in the cache module in each hypervisor in the pool of hypervisors available to be utilized by other virtual machines run by different hypervisors on different cloud computing nodes to form a shared cache module to be utilized by virtual machines run by the pool of hypervisors.

Other forms of the embodiment of the method described above are in a system and in a computer program product.

2

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
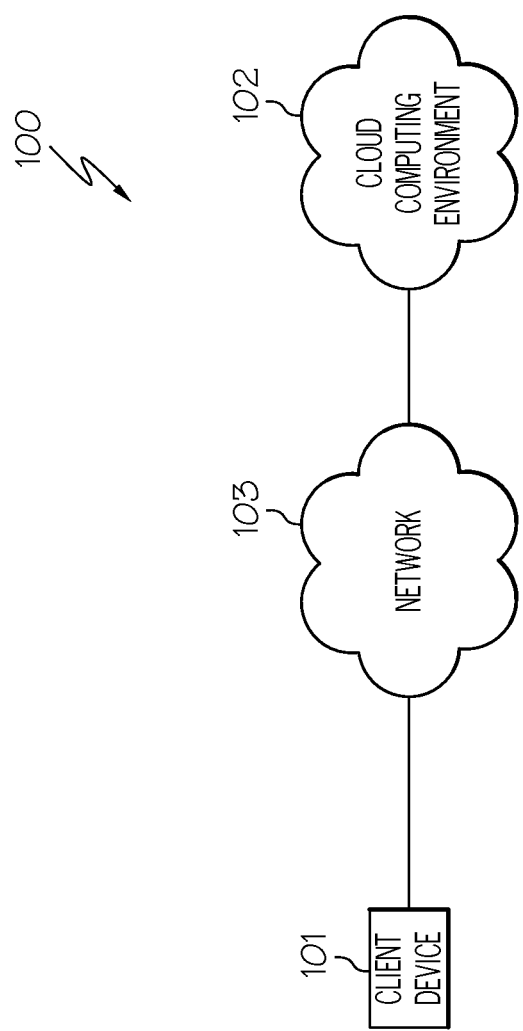
FIG. 1 illustrates a network system configured in accordance with an embodiment of the present invention.

The present invention comprises a method, system and computer program product for efficiently utilizing a virtual file system cache across cloud computing nodes. In one embodiment of the present invention, the hypervisors in a cluster of cloud computing nodes that have a cache module (e.g., look-aside cache) available to it are identified. A determination is then made as to which of these hypervisors will be able to share all or a portion of the memory in its cache module to become a hypervisor in a "pool of hypervisors" based on the workload of the virtual machines run by the hypervisor. For example, the amount of IOPS (input/output operations per second) of the virtual machines run by the hypervisor may be used to determine the utilization of the cache module. If there will be a minimal amount of input/output operations by the virtual machines run by the hypervisor, then a large portion of the cache module (e.g., 300 gigabytes out of 400 gigabytes) will be available to be utilized by other virtual machines run by different hypervisors on different cloud computing nodes. In such a case, the hypervisor that is exposed to such a cache module will form part of a "pool of hypervisors." All or a portion of the memory in the cache module in each hypervisor in the pool of hypervisors that is available to be utilized by other virtual machines run by different hypervisors on different cloud computing nodes is allocated to form a "shared cache module" to be utilized by the virtual machines run by the pool of hypervisors. In this manner, the look-aside cache (cache module) available to the hypervisor in the cloud computing node will be utilized more effectively since any available memory can be utilized by other virtual machines running on different hypervisors on different cloud computing nodes.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
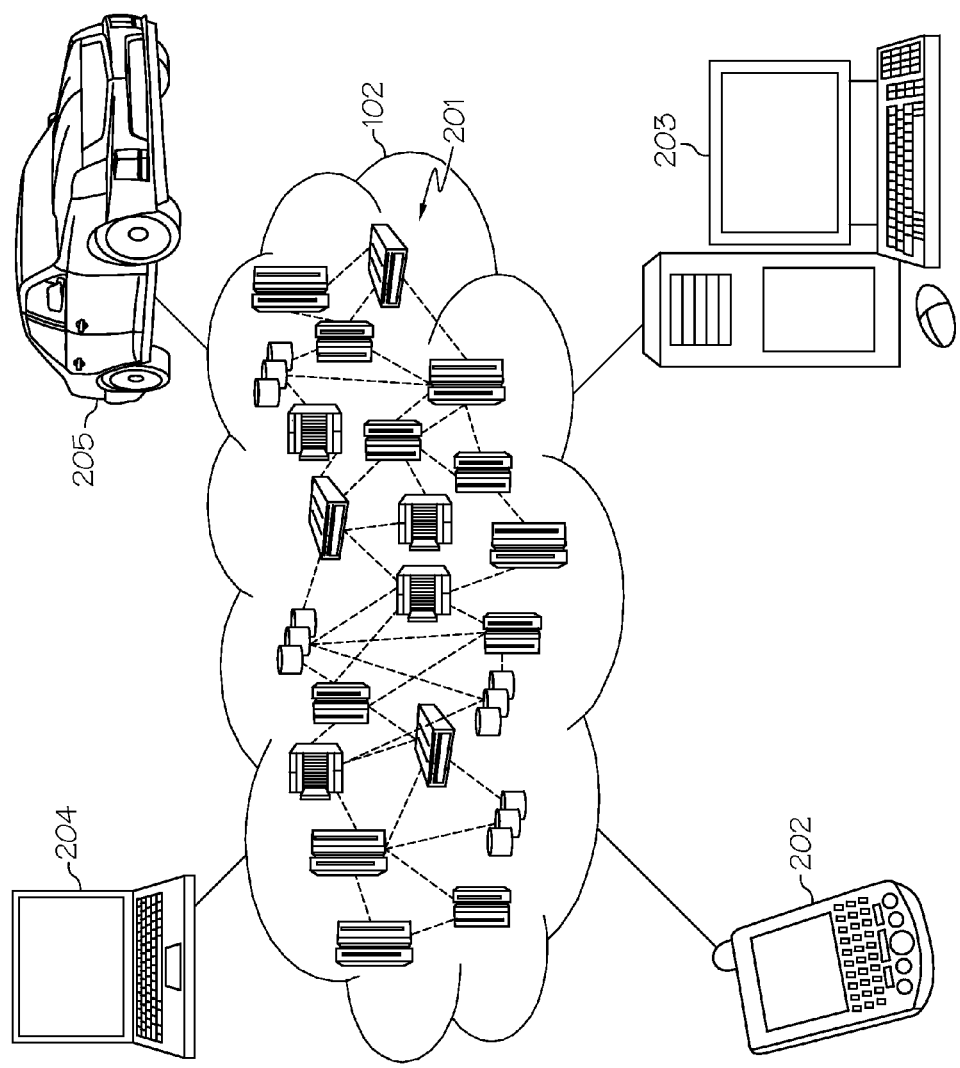
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
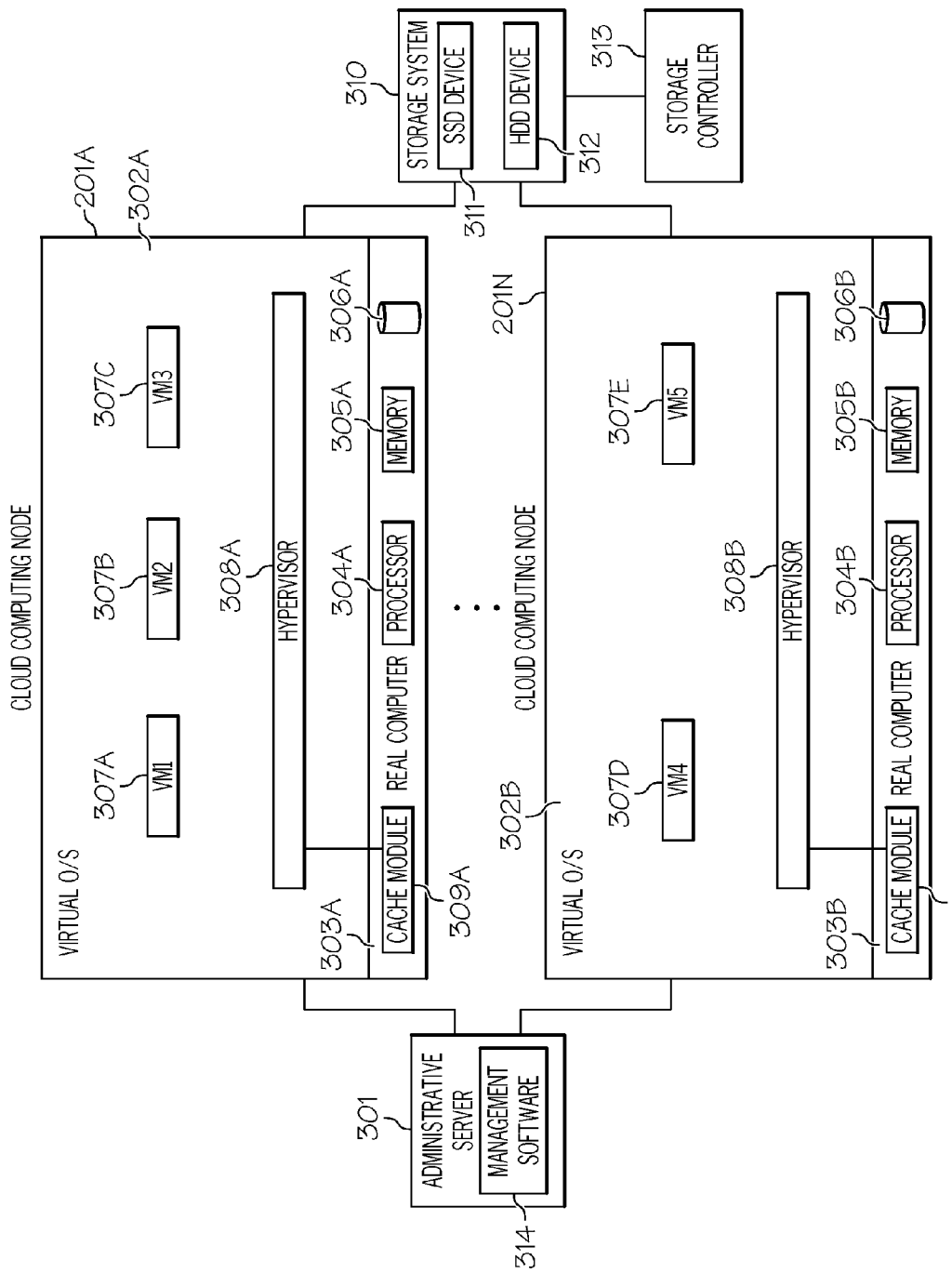
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N, where N is a positive integer number, in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to an administrative server 301 configured to provide data center-level functions of communicating with hypervisors on cloud computing nodes 201 to install virtual machines, terminate/suspend virtual machines and relocate virtual machines from one cloud computing node 201 to another within the data center.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Furthermore, virtual operating system 302A includes one or more virtual machines 307A-307C (identified as "VM 1," "VM 2" and "VM 3," respectively, in FIG. 3) that are run by a hypervisor 308A. Hypervisor 308A may be implemented in microcode running on processor 304A or it may be implemented in software as part of virtual operating system 302A.

Furthermore, cloud computing node 201A includes a cache module 309A in real computer 303A that is available to hypervisor 308A. Cache module 309A, also referred to as the "look-aside cache," is utilized by hypervisor 308A and virtual machines 307A-307C it supports. That is, cache module 309A is utilized by hypervisor 308A and virtual machines 307A-307C run by hypervisor 308A. Cache module 309A may be utilized by hypervisor 308A and virtual machines 307A-307C if access to cache module 309A is faster than access to the physical disks (e.g., Solid-State Drive (SSD) device 311 and Hard Disk Drive (HDD) device 312) discussed below. In one embodiment, cache module 309A is a flash cache module. In another embodiment, cache module 309A is a solid-state device.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, virtual machines 307D-307E (identified as "VM 4" and "VM 5," respectively, in FIG. 3) are functionally the same as virtual machines 307A-307C. Furthermore, hypervisor 308B is functionally the same as hypervisor 308A. Additionally, cache module 309B is functionally the same as cache module 309A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Virtual machines 307A-307E may collectively or individually be referred to as virtual machines 307 or virtual machine 307, respectively. Hypervisors 308A-308B may collectively or individually be referred to as hypervisors 308 or hypervisor 308, respectively. Cache modules 309A-309B may collectively or individually be referred to as cache modules 309 or cache module 309, respectively.

FIG. 3 is not to be limited in scope to a particular number of cloud computing nodes 201 and each cloud computing node 201 may include any number of virtual machines 309, etc. Furthermore, cloud computing nodes 201 include other components that were not discussed herein for the sake of brevity. Additionally, while FIG. 3 depicts each hypervisor 308 having an available cache module 309, there may be some hypervisors 308 that do not have cache module 309 available to it. Hence, cloud computing node 201 is not to be limited in scope to the elements depicted in FIG. 3.

In one embodiment, cloud computing nodes 201 are connected to a storage system 310 which includes various drive devices, such as Solid-State Drive (SSD) device 311 and Hard Disk Drive (HDD) device 312. The storing of data in storage system 310 is controlled by a storage controller 313.

Referring again to FIG. 3, in some embodiments, administrative server 301 supports a module, referred to herein as the management software 314, that can be used to manage all the hardware components of cloud computing nodes 201, monitor system utilization, intelligently deploy images of data and optimize the operations of cloud computing environment 102. Furthermore, management software 314 can be used to efficiently utilize the cache modules 309 (look-aside caches) available to hypervisors 308 across cloud computing nodes 201 as discussed further below in connection with FIG.

5. A description of the hardware configuration of administrative server 301 is provided further below in connection with FIG. 4.

Figure 4:
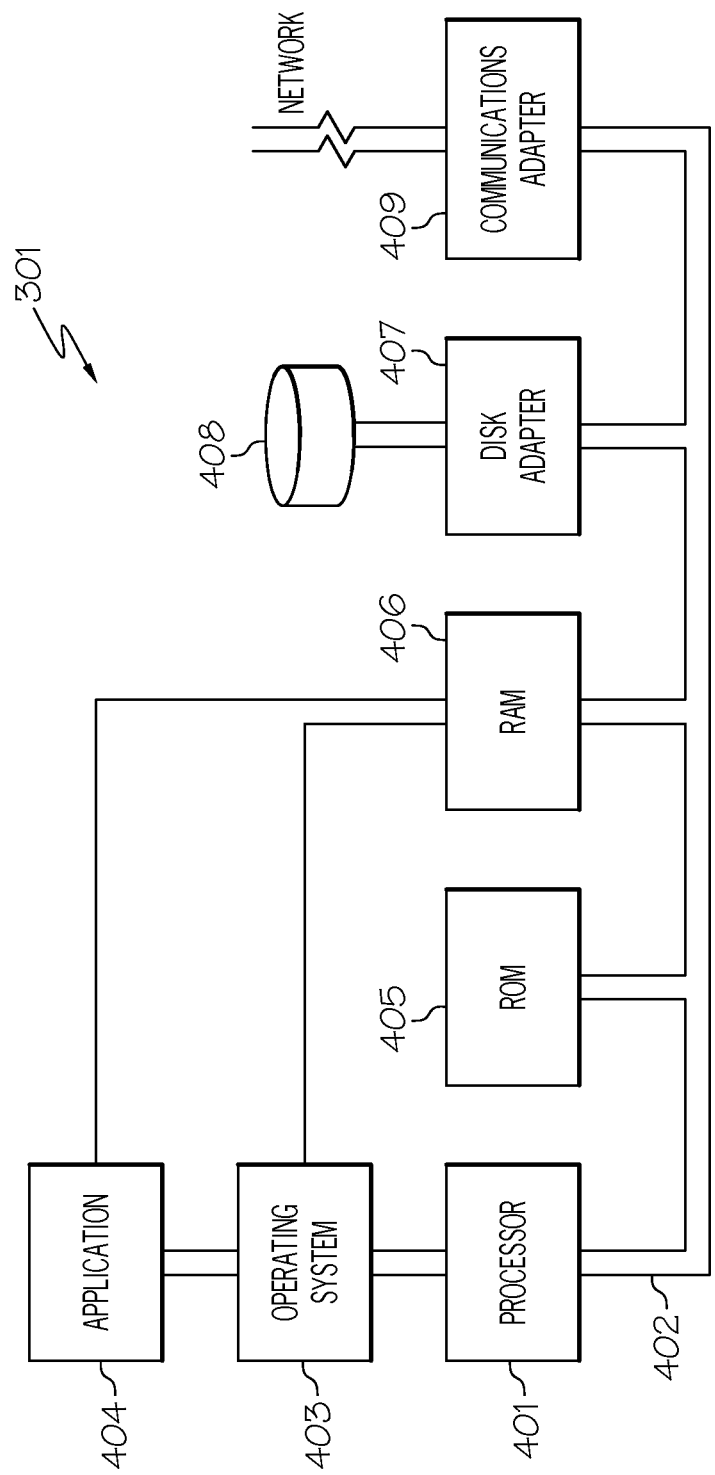
FIG. 4 illustrates a hardware configuration of an administrative server configured in accordance with an embodiment of the present invention.

Referring now to FIG. 4, FIG. 4 illustrates a hardware configuration of administrative server 301 (FIG. 3) which is representative of a hardware environment for practicing the present invention. Administrative server 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program (e.g., management software 314 of FIG. 3) for efficiently utilizing the cache modules 309 (look-aside caches) (FIG. 3) available to hypervisors 308 (FIG. 3) across cloud computing nodes 201 (FIGS. 2 and 3) as discussed further below in association with FIG. 5.

Referring again to FIG. 4, read-only memory ("ROM") 405 is coupled to system bus 402 and includes a basic input/output system ("BIOS") that controls certain basic functions of administrative server 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for efficiently utilizing the cache modules 309 (look-aside caches) available to hypervisors 308 across cloud computing nodes 201, as discussed further below in association with FIG. 5, may reside in disk unit 408 or in application 404.

Administrative server 301 may further include a communications adapter 409 coupled to bus 402. Communications adapter 409 interconnects bus 402 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, the cloud computing nodes of cloud computing environment may utilize a virtual file system cache, commonly referred to as a "look-aside cache," to be used for accelerating shared storage access. The "look-aside cache" is utilized by a single hypervisor and the virtual machines run by the hypervisor. However, in certain situations, the look-aside cache is not being fully utilized due to the minimal input/output (I/O) operations of those virtual machines. Hence, in certain situations, the look-aside cache is being inefficiently utilized.

The principles of the present invention provide a means for efficiently utilizing the look-aside cache by allocating all or a portion of the memory in the cache available to each hypervisor in a pool of hypervisors across cloud computing nodes to form a shared cache to be utilized by the virtual machines running by the pool of hypervisors as discussed below in connection with FIG. 5.

Figure 5:
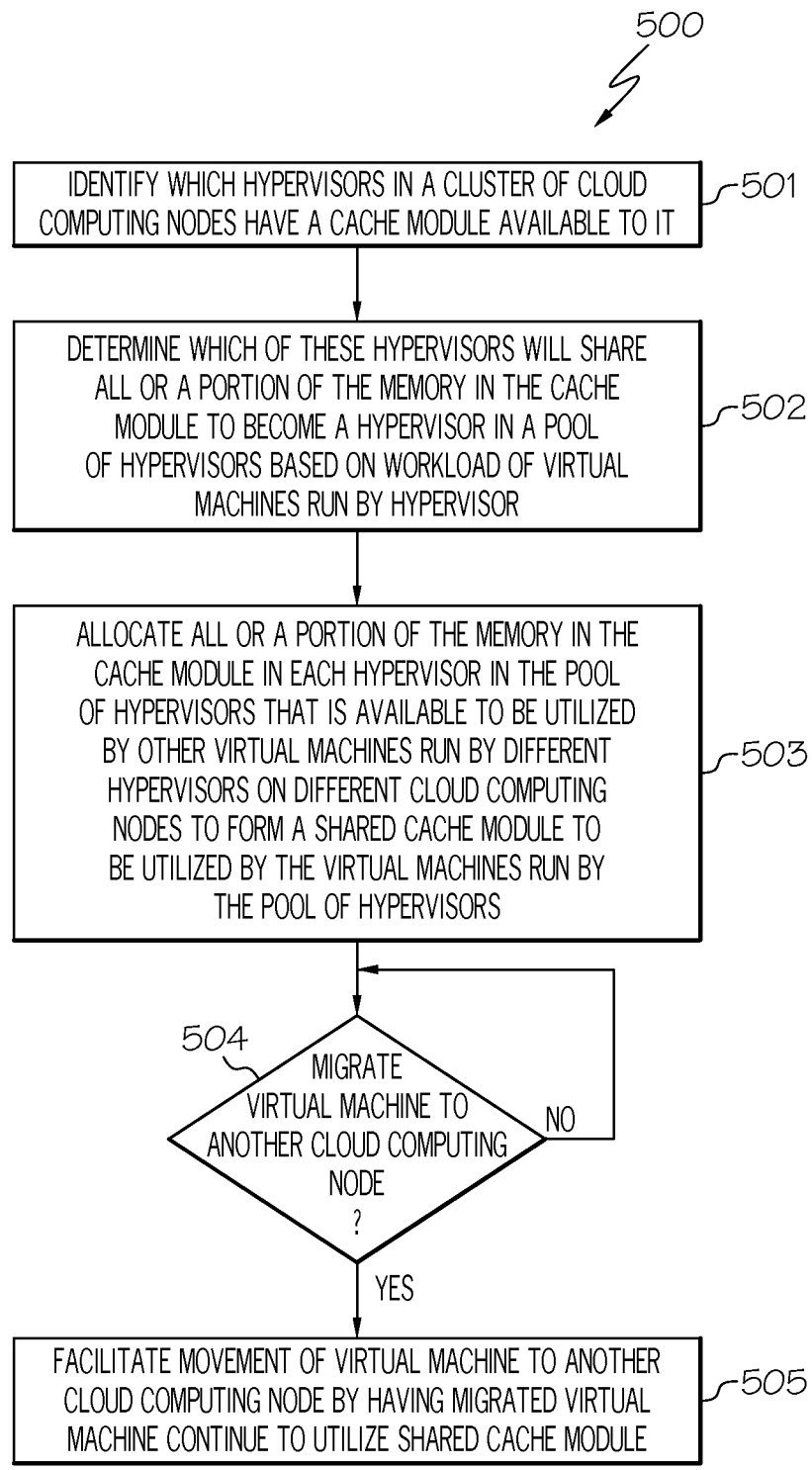
FIG. 5 is a flowchart of a method for efficiently utilizing the cache modules available to the hypervisors across the cloud computing nodes in accordance with an embodiment of the present invention.

FIG. 5 is a flowchart of a method 500 for efficiently utilizing the cache modules 309 (look-aside caches) (FIG. 3) available to hypervisors 308 (FIG. 3) across cloud computing nodes 201 (FIGS. 2 and 3) in accordance with an embodiment of the present invention.

Referring now to FIG. 5, in conjunction with FIGS. 1-4, in step 501, administrative server 301 identifies which hypervisors 308 in a cluster of cloud computing nodes 201 (e.g., cloud computing nodes 201A-201N) have a cache module 309 available to it.

In step 502, administrative server 301 determines which of these hypervisors 308 (those with cache module 309 available to it) will share all or a portion of the memory in cache module 309 to become a hypervisor in a "pool of hypervisors" based on the workload of virtual machines 307 run by hypervisor 308. For example, the amount of IOPS (input/output operations per second) of virtual machines 307 run by hypervisors 308 may be used to determine the utilization of cache module 309. If there will be a minimal amount of input/output operations by virtual machines 307 run by hypervisor 308, then a large portion of cache module 309 will be available (e.g., 300 gigabytes out of 400 gigabytes) to be utilized by other virtual machines 307 run by different hypervisors 308 on different cloud computing nodes 201. In such a case, hypervisor 308 that is exposed to such a cache module 309 will form part of a "pool of hypervisors," where each hypervisor 308 in the pool of hypervisors, contains memory (e.g., 100 gigabytes) in its cache module 309 (e.g., 400 gigabytes) that will be available to be utilized by other virtual machines 307 run by different hypervisors 308 on different cloud computing nodes 201. The memory available to each cache module 309 in the pool of hypervisors 308 across the cluster of cloud computing nodes 201 will be aggregated to form a "shared cache module" available to all virtual machines 307 run by the pool of hypervisors 308 across a cluster of cloud computing nodes 201 as discussed below. If, however, there will be a significant amount of input/output operations by virtual machines 307 run by hypervisor 308, then there may not be any memory in cache module 309 available to be utilized by other virtual machines 307 run by different hypervisors 308 on different cloud computing nodes 201. In such a case, hypervisor 308 will not form part of the pool of hypervisors 308.

In step 503, administrative server 301 allocates all or a portion of the memory in cache module 309 in each hypervisor 308 in the pool of hypervisors 308 that is available to be utilized by other virtual machines 307 run by different hypervisors 308 on different cloud computing nodes 201 to form a "shared cache module" to be utilized by virtual machines 307 run by the pool of hypervisors 308. In this manner, the look-aside cache (cache module 309) available to hypervisor 308 in cloud computing node 201 will be utilized more effectively since any available memory can be utilized by other virtual machines 307 running on different hypervisors 308 on different cloud computing nodes 201.

In step 504, a determination is made by administrative server 301 as to whether virtual machine 307 is migrated from one cloud computing node 201 (e.g., cloud computing node 201A) to another cloud computing node 201 (e.g., cloud computing node 201N).

If virtual machine 307 is not to be migrated from one cloud computing node 201 to another cloud computing node 201, then administrative server 301 continues to determine whether virtual machine 307 is migrated from one cloud computing node 201 (e.g., cloud computing node 201A) to another cloud computing node 201 (e.g., cloud computing node 201N) in step 504.

If, however, virtual machine 307 is migrated from one cloud computing node 201 (e.g., cloud computing node 201A) to another cloud computing node 201 (e.g., cloud computing node 201N), then, in step 505, administrative server 301 facilitates the movement of virtual machine 307 to another cloud computing node 201 by having the migrated virtual machine 307 (e.g., virtual machine 307A) continue to utilize the shared cache module. Prior to utilizing the shared cache module of the present invention, the information stored in the look-aside cache by the migrated virtual machine would be lost when the virtual machine moved to another cloud computing node. Alternatively, the information stored in the look-aside cache by the migrated virtual machine may have been moved to another look-aside cache that would be utilized by the virtual machine after it had moved. However, such a movement of information increased the time of the move operation. By utilizing the shared cache module of the present invention, such problems are eliminated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for efficiently utilizing a virtual file system cache across cloud computing nodes, the method comprising:
   identifying which hypervisors in a cluster of cloud computing nodes have a look-aside cache available to it;
   determining, by a processor, which of said hypervisors in said cluster of cloud computing nodes will share all or a portion of memory in said lookaside cache to become a hypervisor in a pool of hypervisors based on input/output operations of virtual machines running by said hypervisor in said cluster of cloud computing nodes;
   allocating all or a portion of said memory in said look-aside cache in each hypervisor in said pool of hypervisors available to be utilized by other virtual machines run by different hypervisors on different cloud computing nodes to form a shared cache module to be utilized by virtual machines run by said pool of hypervisors;
   migrating a virtual machine from a first cloud computing node to a second cloud computing node; and
   facilitating movement of said virtual machine from said first cloud computing node to said second cloud computing node by having said migrated virtual machine continue to utilize said shared cache module.

2. The method as recited in claim 1, wherein said shared cache module is a flash cache module.

3. The method as recited in claim 1, wherein said shared cache module is a solid-state device.

4. A computer program product for efficiently utilizing a virtual file system cache across cloud computing nodes, the computer program product comprising a computer readable storage medium having program code embodied therewith, the program code comprising the programming instructions for:
   identifying which hypervisors in a cluster of cloud computing nodes have a look-aside cache available to it;
   determining which of said hypervisors in said cluster of cloud computing nodes will share all or a portion of memory in said look-aside cache to become a hypervisor in a pool of hypervisors based on input/output operations of virtual machines running by said hypervisor in said cluster of cloud computing nodes;
   allocating all or a portion of said memory in said look-aside cache in each hypervisor in said pool of hypervisors available to be utilized by other virtual machines run by different hypervisors on different cloud computing nodes to form a shared cache module to be utilized by virtual machines run by said pool of hypervisors;
   migrating a virtual machine from a first cloud computing node to a second cloud computing node; and
   facilitating movement of said virtual machine from said first cloud computing node to said second cloud computing node by having said migrated virtual machine continue to utilize said shared cache module.

5. The computer program product as recited in claim 4, wherein said shared cache module is a flash cache module.

6. The method as recited in claim 4, wherein said shared cache module is a solid-state device.

7. A system, comprising:
   a memory unit for storing a computer program for efficiently utilizing a virtual file system cache across cloud computing nodes; and
   a processor coupled to the memory unit, wherein the processor is configured to execute the program instructions of the computer program comprising:
      identifying which hypervisors in a cluster of cloud computing nodes have a look-aside cache available to it;
      determining which of said hypervisors in said cluster of cloud computing nodes will share all or a portion of memory in said lookaside cache to become a hypervisor in a pool of hypervisors based on input/output operations of virtual machines running by said hypervisor in said cluster of cloud computing nodes;
      allocating all or a portion of said memory in said lookaside cache in each hypervisor in said pool of hypervisors available to be utilized by other virtual machines run by different hypervisors on different cloud computing nodes to form a shared cache module to be utilized by virtual machines run by said pool of hypervisors;
      migrating a virtual machine from a first cloud computing node to a second cloud computing node; and
      facilitating movement of said virtual machine from said first cloud computing node to said second cloud computing node by having said migrated virtual machine continue to utilize said shared cache module.

8. The system as recited in claim 7, wherein said shared cache module is a flash cache module.

9. The system as recited in claim 7, wherein said shared cache module is a solid-state device.

\* \* \* \* \*